United States Patent
Maeno et al.

[11] Patent Number: 6,120,011
[45] Date of Patent: Sep. 19, 2000

[54] ENGINE MOUNT STRUCTURE

[75] Inventors: Kazuhiro Maeno; Makoto Murata; Hiroshi Kojima, all of Tokyo, Japan

[73] Assignees: Fuji Jukogyo Kabushiki Kaisha; Bridgestone Corporation, both of Tokyo, Japan

[21] Appl. No.: 09/330,187

[22] Filed: Jun. 11, 1999

[30] Foreign Application Priority Data

Jun. 15, 1998 [JP] Japan .................................. 10-166996

[51] Int. Cl.[7] ...................................................... F16F 1/38
[52] U.S. Cl. ............................. 267/140.11; 267/140.13; 267/140
[58] Field of Search ......................... 267/140.11, 140.13, 267/140.1–140.4, 141.1, 141.4, 141.7

[56] References Cited

U.S. PATENT DOCUMENTS

| | | | |
|---|---|---|---|
| 4,721,292 | 1/1988 | Saito | 267/140.13 |
| 4,842,258 | 6/1989 | Misaka et al. | 267/140.13 |
| 5,009,404 | 4/1991 | Hirazawa | 267/140.13 |
| 5,078,369 | 1/1992 | Pascal et al. | 267/140.13 |
| 5,263,815 | 11/1993 | Brenner | 267/140.13 |
| 5,704,598 | 1/1998 | Kojima | 267/140.13 |

FOREIGN PATENT DOCUMENTS 3-168425  7/1991  Japan .

*Primary Examiner*—Christopher P. Schwartz
*Attorney, Agent, or Firm*—Smith, Gambrell & Russell, LLP

[57] ABSTRACT

An engine mounting device for connecting an engine with a body of a vehicle through a bumper cushion comprises a first support member connected to the engine, a stopper integrally formed with the first support member, an elastic member integrally formed with the first support member, a second support member connected to the body and a stopper holder integrally formed with the second support member for restricting a movement of the stopper. When the vehicle has an impact, either the stopper or the stopper holder is broken, thereby the engine is disconnected from the body to protect an occupant.

17 Claims, 4 Drawing Sheets

(PRIOR ART)

ENGINE MOUNT STRUCTURE

BACKGROUND OF THE INVENTION

1. Field of the Invention

The present invention relates to an engine mount structure and more particularly to an engine mounting device suitable for the safety designing of a vehicle.

2. Prior Art

A wide variety of engine mounting devices have been proposed to elastically support a power plant such as an engine. For example, Japanese Patent Application Laid-open No. Toku-Kai-Hei 3-168425 discloses a mounting device in which an elastic member is interposed between an inner cylinder and an outer cylinder and a stopper integrally formed with these cylinder members is disposed such that its contact surface is in parallel with the axis of the mounting device in order to restrict an excessive displacement in the orthogonal direction of the axis.

Further, as a second example, there is amounting device in which an inner cylinder is press-fitted to a rubber bushing vulcanized to an outer cylinder and a bracket of the mounting device is formed by synthetic resin.

Further, citing a third example, as shown in FIG. 5, there is a mounting device comprising an engine mount 21A made of metal and a body mount 21B incorporating a cushion rubber. The engine mount 21A is connected to an engine through bolt holes 28A, 28B. Further, bolts 31A, 31B of the body mount 21B are inserted in bolt holes 30A, 30B and are fastened by a nut 32, thus the engine mount 21A being connected with the body mount 21B. A stopper 25 is provided on an extended part of an under plate of the body mount 21B and is enclosed by a stopper holder 26 so as to be allowed to move within a specified range of the stopper holder 26. Further, a heat shield plate 33 is provided to protect. the cushion rubber of the body mount 21B from heat radiation of an exhaust system.

Generally, a stopper of a mounting device provided between an engine and a body acts as restricting a displacement of the engine when such a light impact as not deploying an air bag is applied to the engine. Accordingly, on a light impact, the engine restores an original position without breaking the stopper and the mounting device. When a large impact is applied to the engine in such a manner as deploying an air bag, the engine is largely displaced to break the stopper. As a result, the mounting device is broken and the engine is disconnected from the body to fall down.

According to the first example of the prior art, its object is to restrict an excessive displacement of the stopper and no consideration is paid to the disconnection of the engine.

Further, in the second example of the prior art, the bracket is fabricated of synthetic resin only for the purpose of weight reduction and the disconnection of the engine is not disclosed.

Further, according to the third example, the disconnection of the engine is taken into consideration, however it is difficult to estimate a correct break point of the stopper because all component parts are made of metal and further those are connected by welding. Therefore, this prior art has a difficulty in tuning the countermeasure for impact.

SUMMARY OF THE INVENTION

It is an object of the present invention to provide a mounting device structure easy to tune the countermeasure for impact with a simple construction.

In order to achieve the object, an engine mounting device comprises a first support member connected to an engine, a stopper integrally formed with the first support member, an elastic member integrally formed with the first support member, a second support member connected to a body of a vehicle and a stopper holder integrally formed with the second support member for restricting a movement of the stopper.

DETAILED DESCRIPTION OF PREFERRED EMBODIMENTS

Figure 1A:
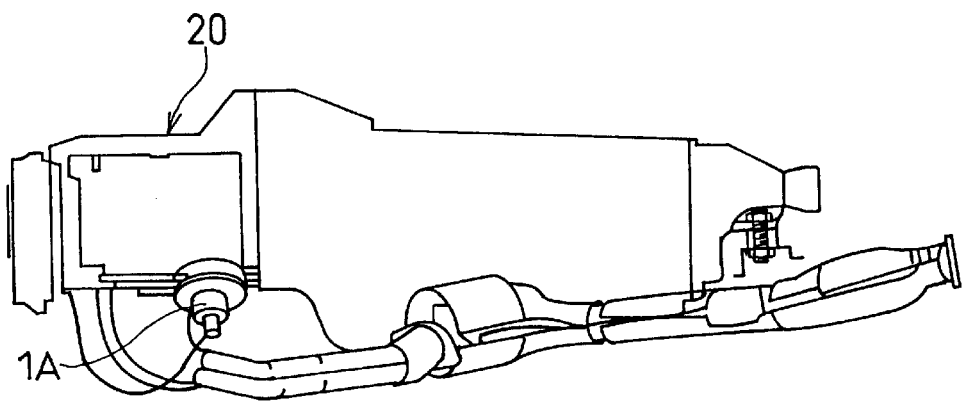
FIG. 1a is a perspective view of a power unit incorporating an engine mount according to the present invention.
Figure 1B:
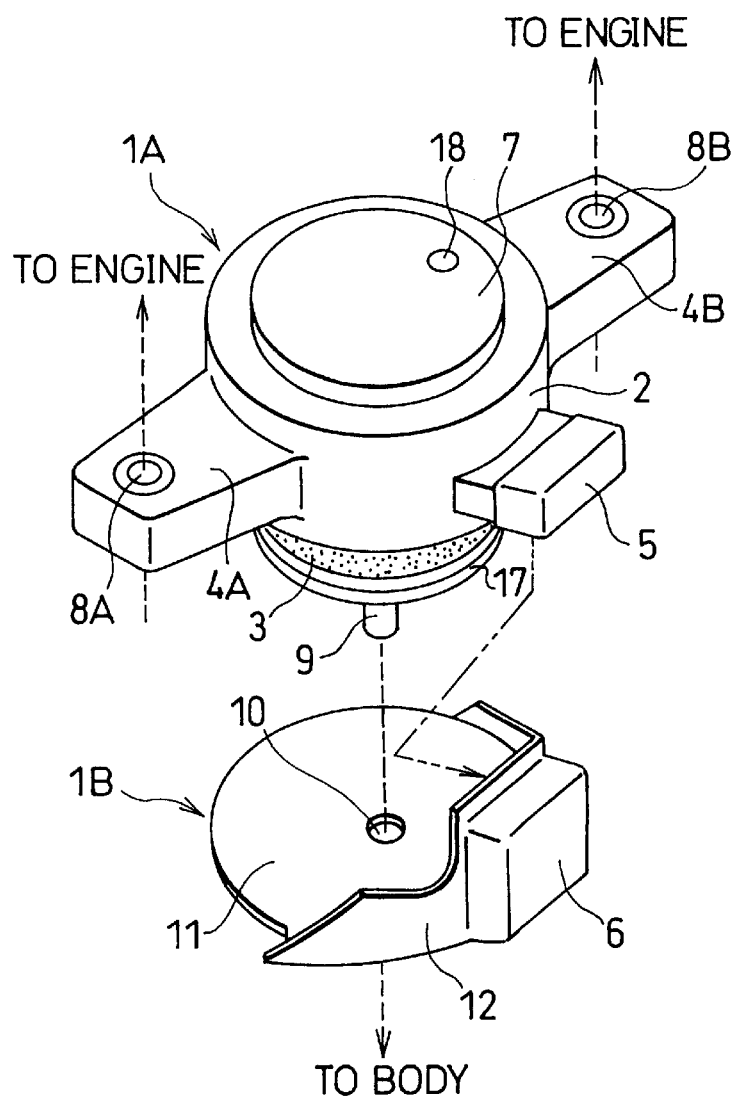
FIG. 1b is an exploded perspective view of an engine mount according to the present invention.
Figure 2:
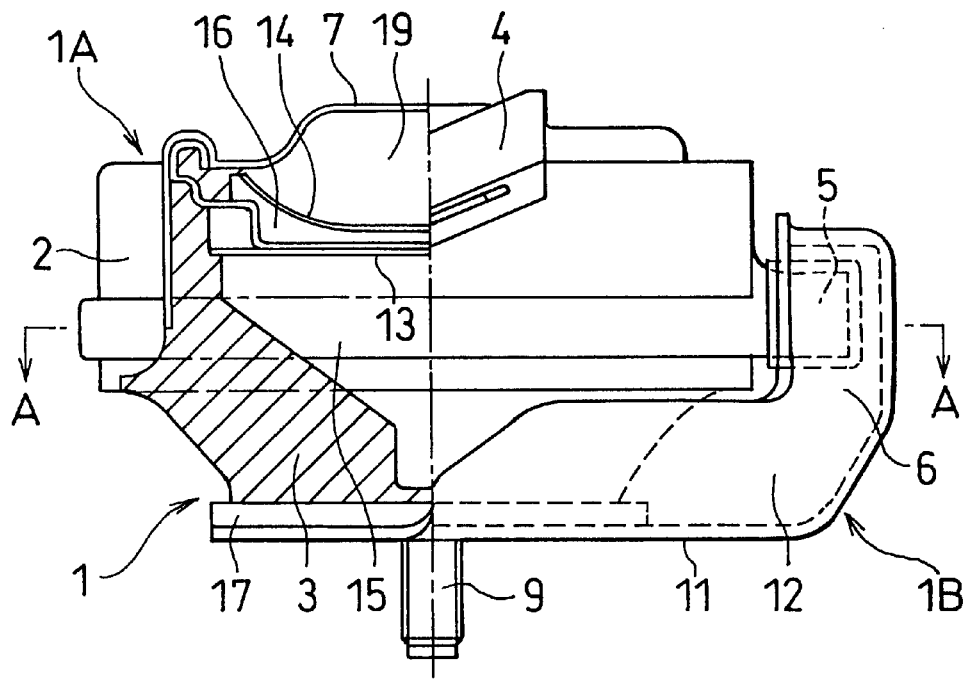
FIG. 2 is a partially sectional view of an engine mount according to the present invention.

Referring to FIG. 1a, a plurality of engine mounting devices are incorporated at suitable places under a power unit to alleviate vibrations and noises. The engine mounting device, as shown in FIG. 1b, comprises two independent members, a first support member 1A connected to a power unit such as an engine and a second support member 1B connected to a vehicle body.

Figure 3:
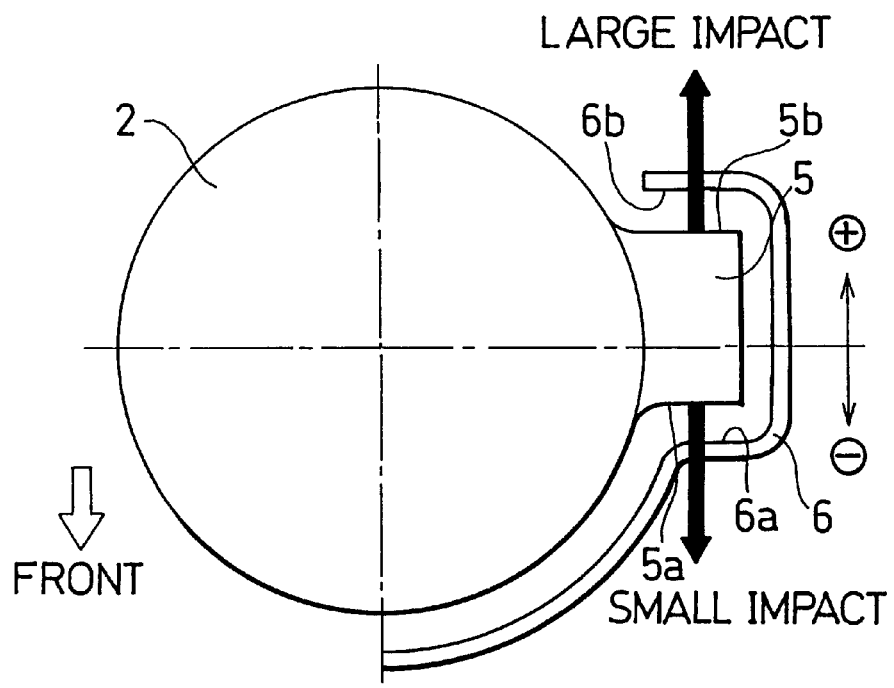
FIG. 3 is a sectional view taken along line A—A in FIG. 2.

The first support member 1A includes a mount housing 2, brackets 4A, 4B and a stopper 5 integrally formed with the mount housing 2, an elastic member 3, an under plate 17 secured to the elastic member 3 such as rubber and a bolt 9 vertically and downwardly secured to the under plate 17. As illustrated in FIG. 3, the stopper 5 is projected from the mount housing 2 with its front side surface 5a and its rear side surface 5b facing in the vehicle running direction.

Further, the elastic member 3 includes a first liquid chamber 15, a second liquid chamber 16, a partition 13 having an orifice (not shown) and a diaphragm 14 and the first liquid chamber 15 is filled with liquid (not shown). The first support member 1A is fastened at bolt holes 8A, 8B provided on the brackets 4A, 4B to the vehicle body by bolts respectively. Further, the second support member 1B is mounted on and fastened to the vehicle body by the bolt 9.

The mount housing 2, the brackets 4A, 4B and the stopper 5 are fabricated of synthetic resin and the second support member 1B is made of a metal sheet integrally stamped. Further, the under plate 17 is rigidly connected with the elastic member 3 through the vulcanization process.

When assembling the first support member 1A, the mount housing 2, the brackets 4A, 4B and the stopper 5 are formed integrally with the elastic member 3 by the one-piece molding. The second support member 1B includes a box-shaped stopper holder 6 for restricting the horizontal and vertical movement of the stopper 5 and a heat shield plate 12 for protecting the elastic member 3 from heat radiation of an exhaust system, and a bolt hole 10 to which the bolt 9 is fitted. The stopper holder 6 is formed such that its front inner surface 6a and its rear inner surface 6b are opposite to the front side surface 5a and the rear side surface 5b of the stopper 5 respectively. Further, the heat shield plate 12 is provided at the front of the stopper holder 6. As will be described hereinafter, the provision of the heat shield plate 12 provides a stronger shear resistance in the stopper holder 6 in the forward direction than in the rearward direction.

When a relatively small shock is applied to the engine at the event of the light impact, the engine is thrown forwardly and the front side surface 5a of the stopper 5 abuts against the front inner surface 6a of the stopper holder 6 as shown in FIG. 3. Thus, the longitudinal movement of the engine is restricted by the stopper holder 6 and the engine restores the original position.

On the other hand, when such a large impact as an air bag is deployed is applied to the vehicle, the engine is displaced rearwardly after the engine is once displaced forwardly and the rear side surface 5b of the stopper 5 strongly hits the rear inner surface 6b of the stopper holder 6. As a result, the bolt 9 and the stopper holder 6 are subjected to shear fracture and the engine is disconnected from the engine mounting device to drop, thereby the engine is prevented from being thrown into the passenger compartment.

When the vehicle is operated in a normal state, the vibrations due to the road roughness and the vibrations, noises originated from the engine are effectively reduced by the isolation and absorption of the elastic member 3 itself and the damping effect of liquid passing through the orifice between the first liquid chamber 15 and the second liquid chamber 16.

Figure 4:
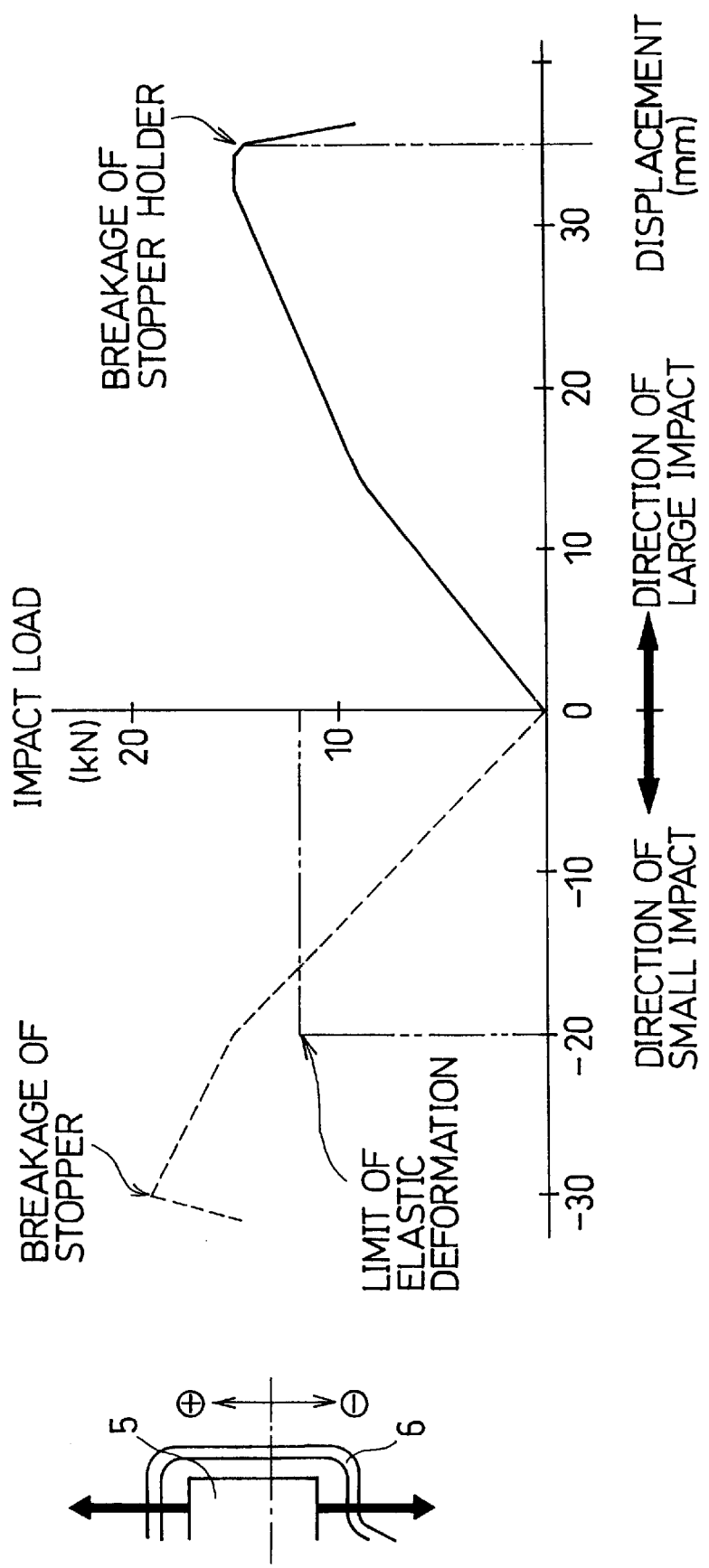
FIG. 4 is a diagram showing a share fracture characteristic of a stopper.
Figure 5:
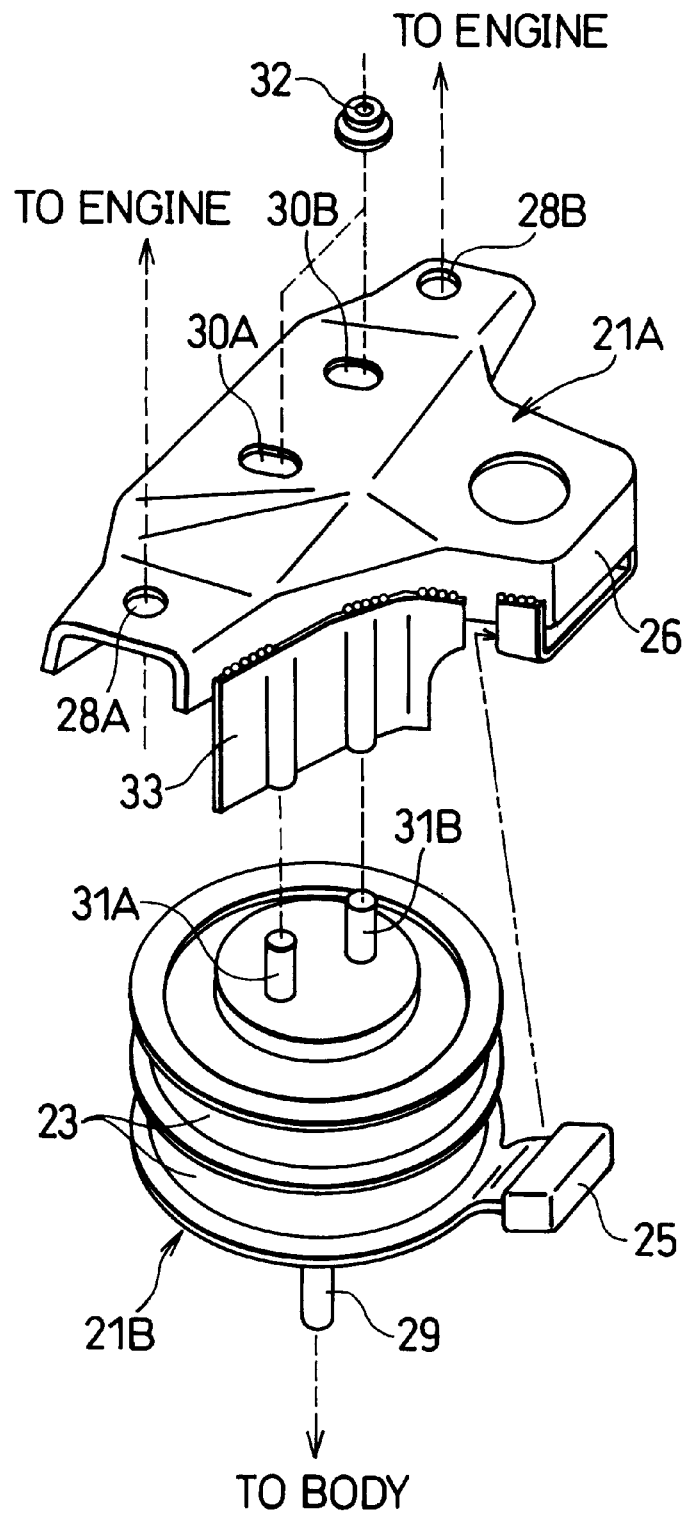
FIG. 5 is an exploded perspective view of a conventional engine mount.

FIG. 4 shows the relationship between the amount of the forward displacement of the stopper 5 and the impact load when the vehicle has an impact. On the small impact side, at the light impact where the impact load is smaller than 12 kN and the amount of the displacement is smaller than −20 mm, the elastic deformation of the elastic member 3 is allowed within the allowable range of deformation of the stopper holder 6 and accordingly the engine restores the original position. Further, when the amount of the displacement is between −20 mm and −30 mm, it exceeds the allowable range of deformation of the stopper holder 6 and accordingly the stopper holder 6 is deformed while being accompanied by destruction. Furthermore, when the impact load is more than 20 kN and the amount of the displacement exceeds −30 mm, the stopper 5 is broken due to a shearing force which is larger than the sharing strength thereof and consecutively the elastic member 3 is broken, the first support member 1A being parted from the second support member 1B.

On the large impact side, the relationship between the amount of the backward displacement and the impact load when the vehicle has a large impact, is shown. At the light impact where the impact load is not more than 10 kN and the amount of displacement is not more than +15 mm, the elastic deformation of the elastic member 3 is allowed within the allowable range of deformation of the stopper holder 6 and accordingly the engine restores the original position. Further, when the amount of the displacement is larger than +15 mm and smaller than +30 mm, it exceeds the allowable range of deformation of the stopper holder 6 and accordingly the stopper holder 6 is deformed while being accompanied by destruction. Furthermore, when the impact load is more than 15 kN and the amount of the displacement exceeds +35 mm, the stopper holder 6 is broken due to a shearing force which is larger than the shearing strength thereof and consequtively the elastic member 3 is broken, the first support member 1A being parted from the second support member 1B.

Here, instead of breaking the stopper holder 6, the stopper 5 may be broken by reducing the relative shearing strength thereof.

Thus, in this embodiment, the shearing strength in the forward direction is established to be larger than that in the rearward direction. Specifically, the distance between the rear side surface 5b and the rear inner surface 6b is established to be smaller than that between the front side surface 5a and the front inner surface 6a and additionally the stopper holder 6 is formed to be breakable in the rearward direction.

As a result, when the power unit such as an engine is displaced forwardly due to the inertia force accompanied by an impact, the engine mounting device according to the present invention has a relatively large resistance to shock in the forward direction and when the power unit is displaced rearwardly, since the engine mounting device has a relatively small resistance to shock in the rearward direction, the engine is easy to drop from the vehicle body even with a relatively small impact.

As described above, according to the present invention, since the engine mounting device has a simple construction in such a manner as comprising the first support member integrally formed with the elastic member and the second support member fabricated of the one-piece sheet metal, the small number of the components is advantageous in reducing the manufacturing cost and weight.

Further, since the stopper is made of synthetic resin and the stopper holder is fabricated of a simple sheet metal, it is easy to control the shearing strength of the stopper or the stopper holder and as a result the accuracy of the impact tuning can be raised.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An engine mounting device for connecting an engine with a body of a vehicle, comprising:

a first support member being capable of connection with said engine;

a stopper integrally formed with said first support member;

an elastic member integrally formed with said first support member;

a fixing bolt extending from said first support member toward said vehicle and being capable of connection with said vehicle;

a second support member having a hole through which said fixing bolt extends and thereby being capable of connection with said body; and a stopper holder integrally formed with said second support member for restricting a movement of said stopper.

2. The engine mounting device according to claim 1, wherein said stopper is broken when an impact is applied to said stopper in a forward direction so as to disconnect said engine from said body.

3. The engine mounting device according to claim 1, wherein said stopper holder is broken when an impact is applied to said stopper in a rearward direction so as to disconnect said engine from said body.

4. The engine mounting device according to claim 1, wherein said stopper is broken when an impact is applied to said stopper in a rearward direction so as to disconnect said engine from said body.

5. The engine mounting device according to claim 1, wherein said first support member including said bracket and said stopper is fabricated of synthetic resin.

6. The engine mounting device according to claim 1, wherein said second mounting member is provided a heat shield plate at the front of said stopper holder.

7. The engine mounting device according to claim 1, wherein said stopper holder is broken when a first predetermined impact is applied to said stopper in a rearward direction, and said stopper holder is broken when a second predetermined impact different in impact load from said first predetermined impact is applied to said stopper in a forward direction.

8. A power unit mount for supporting a power unit on a vehicle body, comprising:

a base plate;

cushion means made of an elastic material and permanently and rigidly formed on said base plate;

a bracket portion having a cylindrical shape fixedly mounted on said cushion means;

a pair of flanges oppositely extending in radial directions from said bracket portion and provided with holes which are capable of connection with said power unit by fastening means;

a fixing stud bolt rigidly and downwardly protruding from a center portion of said base plate;

a stopper radially protruding at an intermediate position approximately halfway between said pair of flanges;

a washer plate provided below said base plate and having a hole at a center position; and a stopper holder formed at a peripheral end portion of said washer plate for receiving said stopper.

9. The power unit mount according to claim 8, further comprising:

a heat shield plate provided in front of said stopper holder.

10. The power unit mount according to claim 8, wherein:

said bracket portion is made of plastic material and said cushion means is a cushion rubber enclosing a fluid.

11. The power unit mount according to claim 8, wherein:

said bracket portion is made of plastic material and said cushion means is a cushion rubber.

12. The power unit mount according to claim 8, wherein said stopper holder is broken when a first predetermined impact is applied to said stopper in a rearward direction, and said stopper holder is broken when a second predetermined impact different in impact load from said first predetermined impact is applied to said stopper in a forward direction.

13. A power unit mount for supporting a power unit on a vehicle body, comprising:

a first support member having a stopper protruding therefrom and brackets capable of connecting said first support member to said power unit by fastening means;

an elastic member integrally formed with said first support member having a bolt downwardly protruding therefrom which is capable of connecting said first support member to said vehicle body;

a second support member having a stopper holder and a bolt hole for receiving said bolt and being capable of fastening said support member to said vehicle body.

14. The power unit mount according to claim 13, wherein:

said first support member has a larger shear resistance in the forward direction than in the rearward direction, so as to have a large resistance to shock in the forward direction for protecting said power unit from dropping easily and having a small resistance to shock in the rearward direction for dropping said power unit easily.

15. The power unit mount according to claim 13, wherein:

a distance between said stopper and a front side inner surface of said stopper holder is larger than the distance between said stopper and a rear side inner surface of said stopper holder.

16. The power unit mount according to claim 13, wherein:

said stopper and said brackets are made of synthetic resin.

17. The power unit mount according to claim 13, wherein:

said second support member is provided with a heat shield plate near said stopper holder.

* * * * *